(12) United States Patent
Suga et al.

(10) Patent No.: US 6,478,570 B1
(45) Date of Patent: Nov. 12, 2002

(54) DISC-MANUFACTURING MOLD AND DISC MANUFACTURING APPARATUS USING THE SAME

(75) Inventors: Keiji Suga, Tsurugashima (JP); Noriyoshi Shida, Tsurugashima (JP); Tetsuya Imai, Tsurugashima (JP); Tetsuya Iida, Tsurugashima (JP)

(73) Assignee: Pioneer Corporation (JP)

( * ) Notice: Subject to any disclaimer, the term of this patent is extended or adjusted under 35 U.S.C. 154(b) by 15 days.

(21) Appl. No.: 09/650,191

(22) Filed: Aug. 29, 2000

(30) Foreign Application Priority Data

Sep. 1, 1999 (JP) .......................................... 11-247680

(51) Int. Cl.$^7$ .............................................. B29C 45/73
(52) U.S. Cl. ...................................... 425/552; 425/810
(58) Field of Search ................................ 425/547, 552, 425/810; 249/79; 264/106, 107, 328.16

(56) References Cited

U.S. PATENT DOCUMENTS

| | | | | |
|---|---|---|---|---|
| 1,582,704 A | * | 4/1926 | Sylvester et al. | ............ 165/154 |
| 1,582,714 A | * | 4/1926 | Wells | ............................ 249/79 |
| 3,830,459 A | * | 8/1974 | Strausfeld | ..................... 249/79 |
| 4,462,780 A | * | 7/1984 | Stavitsky et al. | ............ 264/106 |
| 5,783,233 A | * | 7/1998 | Takahashi | ..................... 264/107 |

* cited by examiner

Primary Examiner—Jan H. Silbaugh
Assistant Examiner—Donald Heckenberg
(74) Attorney, Agent, or Firm—Nixon & Vanderhye PC

(57) ABSTRACT

There are provided a disc-manufacturing mold capable of manufacturing a disc substrate having no irregularities in thickness in its circumferential direction and a disc manufacturing apparatus using the mold. The disc-manufacturing mold is used for forming a disc substrate by injection molding. A cooling water ditch is arranged on the mold. The cooling water ditch is configured such that a disc distorts substantially evenly in its circumferential direction when the disc is manufactured.

8 Claims, 8 Drawing Sheets

ANALYZED RESULTS OF AMOUNT OF
DISTORTION ON CIRCUMFERENCES OF
MIRROR PLATE
(WHEN DISTORTION OCCURS BY 30 μm
AT R20)

FIG. 5

| NUMBER OF TURNS M | DITCH WIDTH G (mm) | INTERVAL L BETWEEN DITCH PATHS (mm) | DISTANCE A BETWEEN CIRCULAR CENTERS (mm) | OUTERMOST CIRCUMFERENTIAL DIAMETER D OF DITCH (mm) |
|---|---|---|---|---|
| 3 | 3~28 | 1~38 | 2~32 | 50~200 |
| 4 | 3~20 | 1~25 | 2~23 | 60~200 |
| 5 | 3~16 | 1~18 | 2~17 | 60~200 |
| 6 | 3~13 | 1~14 | 2~13 | 80~200 |
| 7 | 3~11 | 1~11 | 2~11 | 80~200 |
| 8 | 3~9 | 1~9 | 2~9 | 100~200 |
| 9 | 3~8 | 1~8 | 2~8 | 100~200 |
| 10 | 3~7 | 1~7 | 2~7 | 100~200 |

THIS SHOWS DITCH-PATH INTERVAL L AND OUTERMOST CIRCUMFERENTIAL DIAMETER D IN CASE THAT DITCH WIDTH G IS CHANGED IN A RANGE LIMITED BY INNER DIAMETER = 30mm AND OUTER DIAMETER = 200mm.

(CALCULATION FORMULA)

$$L_{min} = (85 - G_{max} \times M) / (M-1)$$
$$L_{max} = (85 - G_{min} \times M) / (M-1)$$
$$D_{min} = \{(G_{min} + L_{min}) \times (M-1) + G_{min} + 15\} \times 2$$
$$D_{max} = \{(G_{max} + L_{min}) \times (M-1) + G_{max} + 15\} \times 2$$

COMPARISON BETWEEN DISTRIBUTIONS OF
THICKNESS OF SUBSTRATES (R-46mm)

DISC-MANUFACTURING MOLD AND DISC MANUFACTURING APPARATUS USING THE SAME

BACKGROUND OF THE INVENTION

The present invention relates to a manufacturing apparatus of a disc substrate by means of injection molding, and in particular, relates to a mold used in the manufacturing apparatus.

One method of producing a disc substrate is known as an injection molding method of resin such as polycarbonate. An injection molding apparatus for this method has fixed type and movable type of molds arranged face to face. In both molds, two mirror plates facing with each other are placed and a gap is formed when those plates are butted. A stamper on which desired information tracks are formed is disposed on the fixed type of mold, in which a cavity formed by the mirror plates is filled with molten resin. A cooling water ditch is formed on each mirror plate in order to cool the resin filled in the cavity. When the resin has been cooled down to an adequate temperature and set, the movable type of mold is retreated to take out a disc made of the set resin. Such a disc manufacturing method is exemplified by a Japanese Patent Laid-open (KOKAI) Publication No. 11-192642.

As described above, in the injection molding apparatus for disc substrates, for the purpose of cooling resin between the molds, the cooling water ditch is formed on the back of the mirror plates of the molds.

FIG. 1 is a plan view showing one example of the shape of such a cooling water ditch. Usually, a cooling water ditch is formed on a mirror plate 30 of a specified thickness. In FIG. 1, the cooling water ditch 31 includes a plurality of circumferential parts 32 shaped into concentric circles and a plurality of straight parts 34 connecting those circumferential parts 32 to each other. Cooling water enters this cooling water ditch from, for example, an innermost inlet 38 thereof, flows along its ditch path consisting of the circumferential parts 32 and straight parts 34, and flows out of an outlet 40. Hereinafter, an area in which the straight parts 34 are arranged in the radius direction is also called flex section 36 (refer to a dotted area in FIG. 1).

In general, when resin is injected in a cavity formed between the mirror plates of the mold, the mirror plates are brought into distortion in the shape of a bowl because of injection pressure caused by the injected resin. In other words, the two facing mirror plates, in themselves, deflect due to the injection pressure, with the result that a certain amount of deflection caused in the central area is slightly larger than that in the peripheral area thereof.

However, as shown in FIG. 1, in cases the cooling water ditch includes the flex section 36, an amount of distortion in the flex section 36 becomes uneven due to the injection pressure compared to that in the remaining section. Hence, disc substrates that are manufactured using a mold having such mirror plates have uneven thicknesses. It is a general tendency that the flex section 36 or thereabout of a disc substrate to be manufactured is thinner in the circumferential direction than the remaining section thereof. Therefore, the aberration of a light beam reading information becomes larger in reproducing information from the disc, thus leading to problems, such as deterioration of signals and others.

SUMMARY OF THE INVENTION

The present invention has been made with consideration of the foregoing inconveniences, and an object of the present invention is to provide a disc-manufacturing mold capable of manufacturing a disc substrate with almost no irregularities in thickness in the circumferential direction and a disc manufacturing apparatus using the mold.

The invention may be embodied in a disc-producing mold for forming a disc substrate having a circumferential direction by injection molding, comprising a cooling water ditch for distorting the disc substrate substantially evenly in the circumferential direction in forming the disc substrate. Accordingly, a disc substrate to be manufactured is prevented from having irregularities in thickness in the circumferential direction.

In the alternative the invention may be embodied in a disc-producing mold for forming a disc substrate having a circumferential direction by injection molding, comprising a cooling water ditch which revolves a plurality of turns with continuous crooks in the circumferential direction. This makes it possible to distort the mold evenly against injection pressure of molten resin, stopping a disc substrate from having irregularities in thickness in the circumferential direction.

According to a further feature of the invention, cooling water ditch is formed by a plurality of arcs of which radiuses are different from each other and connected to each other along the arcs. Thus, the cooling water ditch can easily be cut out and formed from the body of a mold.

According to a further feature of the invention, the cooling water ditch has a constant width part having an approximately constant width and connecting an inlet and an outlet of cooling water, a first convergent part connected to the inlet as well as located oppositely to the certain width part with the inlet being as a reference, and a second convergent end connected to the outlet as well as located oppositely to the certain width part with the outlet being as a reference. The existence of the convergent ends allows both of a cooling characteristic distribution of a mold given by the cooling water ditch and a strength distribution of the mold to be even in the vicinities of both ends of the cooling water ditch.

According to yet a further feature of the invention, the cooling water ditch has turns of three or more and a width of 3 mm or more. Setting the number of turns of the cooling water ditch to three or more can give the mold more even cooling and strength characteristics, whilst setting the width of the cooling water ditch to 3 mm or more can provide a necessary flow amount of cooling water into the cooling water ditch.

According to a further feature of the invention, the cooling water ditch is shaped into a configuration where half-arcs having mutually different two centers are alternately connected to each other, in which a distance A between the two centers is expressed by A=(G+L)/2, where G denotes a width of the cooling water ditch and L denotes an interval between adjoining ditch paths of the cooling water ditch. By this configuration, the cooling water ditch can be formed by mutually connecting half-arcs centered at different two points. Thus the cooling water ditch is formed easily.

In an embodiment of the invention, an area in which the cooling water ditch is formed is larger than an area occupied by the disc substrate to be manufactured. Accordingly, a disc substrate is formed within an area of which cooking characteristic and strength are uniform due to the formation of the cooling water ditch, resulting in that the disc substrate is manufactured with almost no thickness irregularities in its circumferential direction.

A disc substrate manufactured by the producing apparatus of the invention will have thickness irregularities diminished almost completely in its circumferential direction.

BRIEF DESCRIPTION OF THE DRAWINGS

In the accompanying drawings:

FIG. 5 is a table explaining various shape examples of cooling water ditches applicable to a mold according to the present invention;

DETAILED DESCRIPTION OF THE PREFERRED EMBODIMENTS

First, prior to the description of a preferred embodiment according to the present invention, consideration will now be made to the relationship between the presence of a flex section in a cooling water ditch of a mold and an amount of distortion of the mold.

Figure 1:
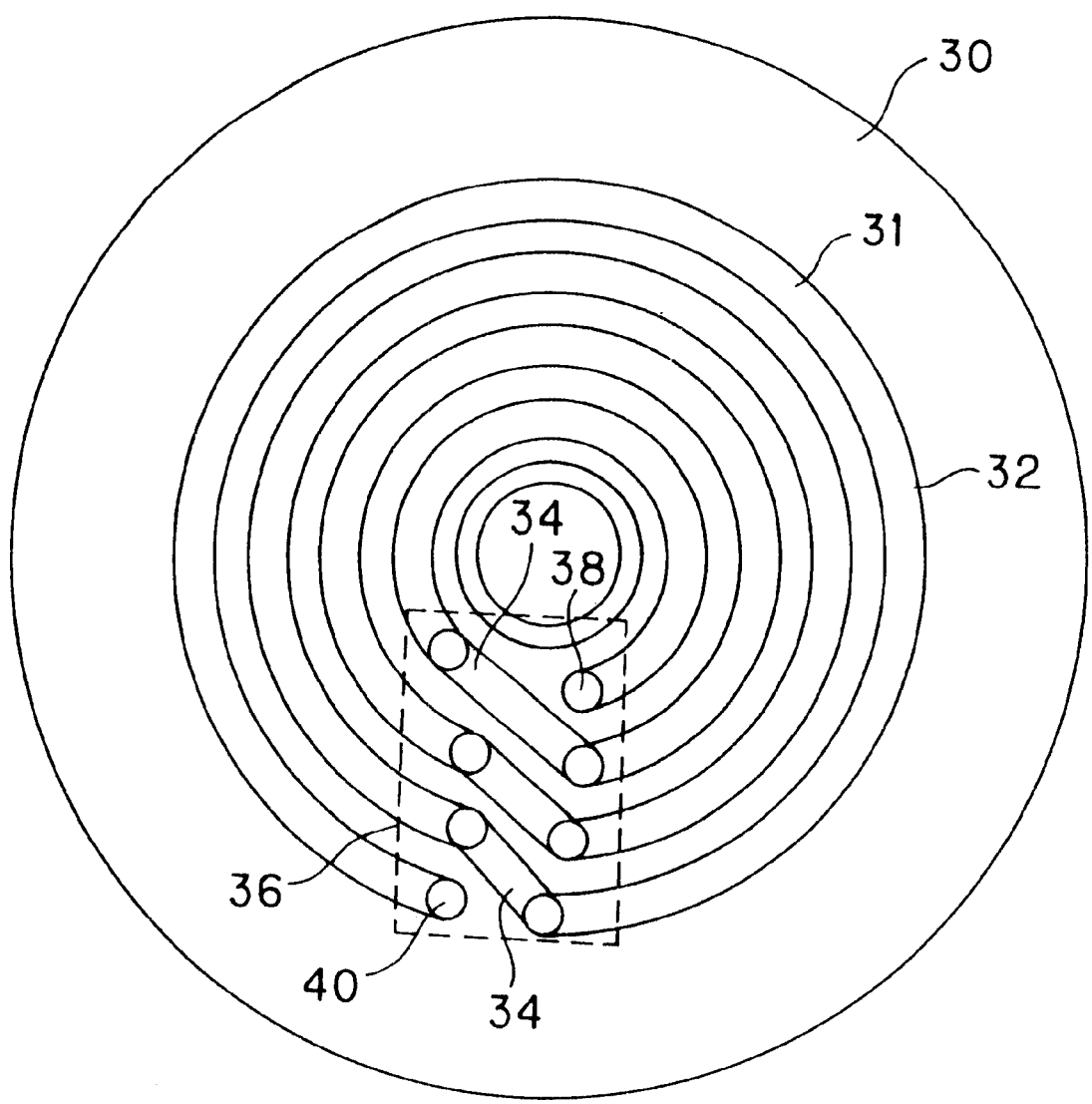
FIG. 1 is a plan view illustrating the shape of a cooling water ditch formed for a mold of a disc manufacturing apparatus conventionally used.
Figure 3A:
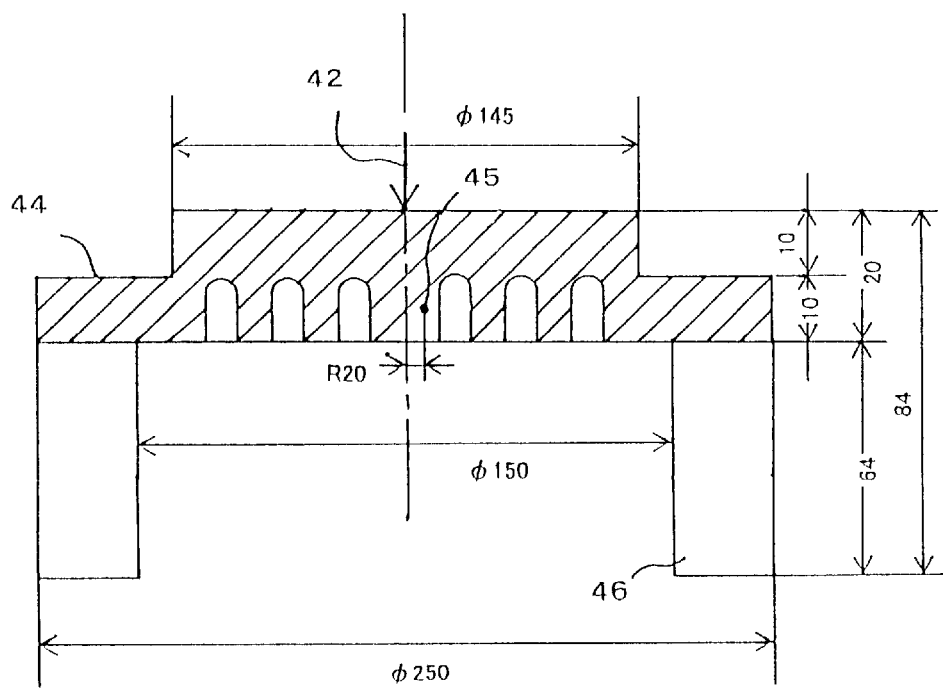
FIG. 3A is an illustration showing a mold model used in analysis of amounts of distortion, which has a conventionally structured cooling water ditch.
Figure 3B:
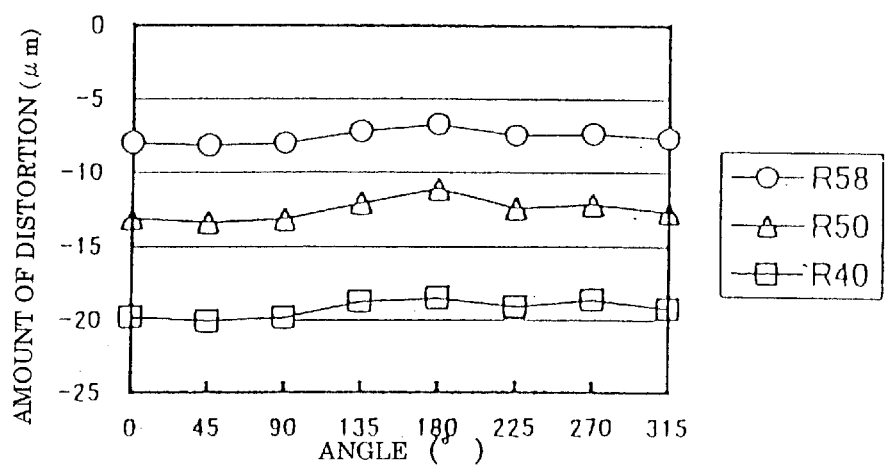
FIG. 3B shows graphs explaining analyzed results on the model shown in FIG. 3A.

As a mold in which a cooling water ditch has the flex section shown in FIG. 1, a model shown in FIG. 3A was prepared for analysis. FIG. 3A is a cross sectional view illustrating a model of a mold. The mold has a base 46, on which a mirror plate 44 is placed on which a cooling water ditch having a flex section is made. A load was applied at a position and in a direction both shown by an arrow 42. With the position of the arrow 42 centered, a load that will bring about an amount of distortion of 30 μm at the position of a radius of 20 mm was applied at the position of the arrow 42, and amounts of distortion are measured at three sets of circumferential locations of radiuses 40 mm, 50 mm and 58 mm on the plate, respectively. The measured results are shown in FIG. 3B, in which angles along the lateral axis represent circumferential positions on the circular mirror plate. A flex section such as shown in FIG. 1 is formed in the direction defined by an angle of 180 degrees.

It can be understood from the measured results in FIG. 3B that, for any radial position, amounts of distortion become small in an range of angles of 180 degrees or thereabouts in which the flex section is formed. This means that the portion of the flex section is formed into a structure that is reluctant to distortion more strongly compared to the remaining section (that is, the area covering the cooling water ditch paths are disposed in concentric circles: refer to FIG. 1). It is assumed that this results from the fact that a plurality of straight members contained in the flex section serve as beams placed in the radius direction such that the strength of the flex section against the injection pressure from the resin is enhanced. Therefore, it was confirmed that the presence of the flex section in the cooling water ditch formed on the mirror plates of the molds resulted in a disc substrate having irregularities in thicknesses in the circumferential direction.

With consideration of the above analysis, an embodiment of not merely a mold that distorts evenly in the circumferential direction in response to the injection pressure from resin but also a disc manufacturing apparatus using this mold will now be described in conjunction with the drawings.

Figure 4:
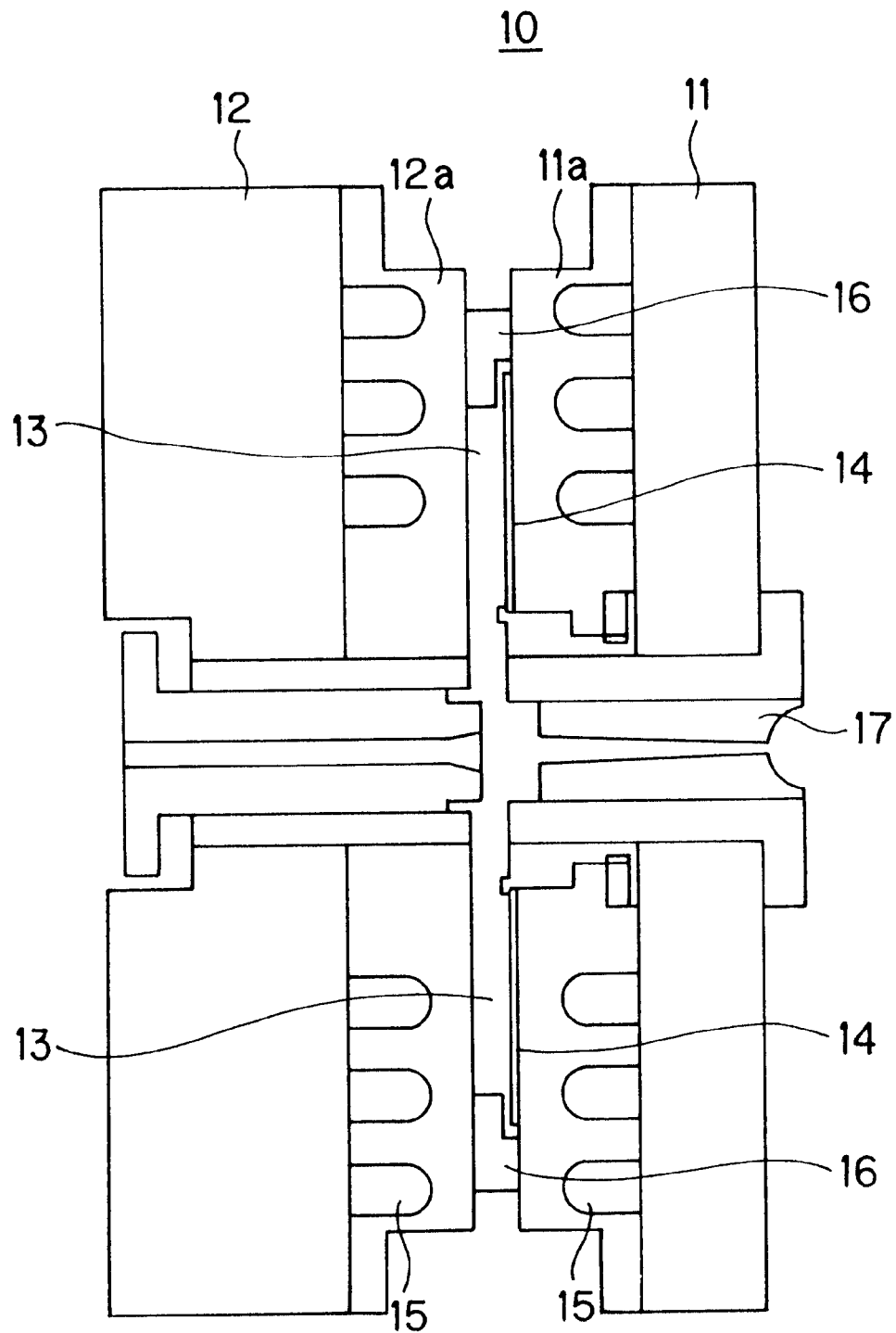
FIG. 4 is a vertical elevation showing a structure of a mold installed in a disk manufacturing apparatus.

FIG. 4 is a vertical elevation showing part of a mold of a disc manufacturing apparatus according to the embodiment of the present invention. As shown therein, the disc manufacturing apparatus 10 has a fixed type of mold 11 and a movable type of mold 12. The fixed type of mold 11 is provided with a mirror plate 11a, while the movable type of mold 12 has a mirror plate 12a. Both mirror plates 11a and 12a faces to each other and are able to make contact with each other so as to form a cavity 13 restricted in the circumferential direction by an outer circumferential ring 16.

A resin injection inlet 17 is formed through the fixed type of mold 11, and molten resin to form a disc substrate is injected into the cavity 13 through the injection inlet 17. A cooling water ditch 15 is formed on the back of each of the mirror plates 11a and 12a, in which cooling water is made to flow through the ditch so as to cool the resin injected in the cavity 13 until it sets. A stamper 14 is fixed on the mirror plate 11a of the fixed type of mold 11. Hence, information tracks formed on the stamper 14 can be transferred to a disc formed of the set resin.

When the resin has been set to form a disc substrate, the movable type of mold 12 is moved to the left side in the figure, before the disc substrate is taken out. A mechanism for taking out the produced disc substrate and processing performed with the substrate after its taking out are based on well-known techniques and are not directly related to the present invention, so those are omitted from detailed description.

Figure 2A:
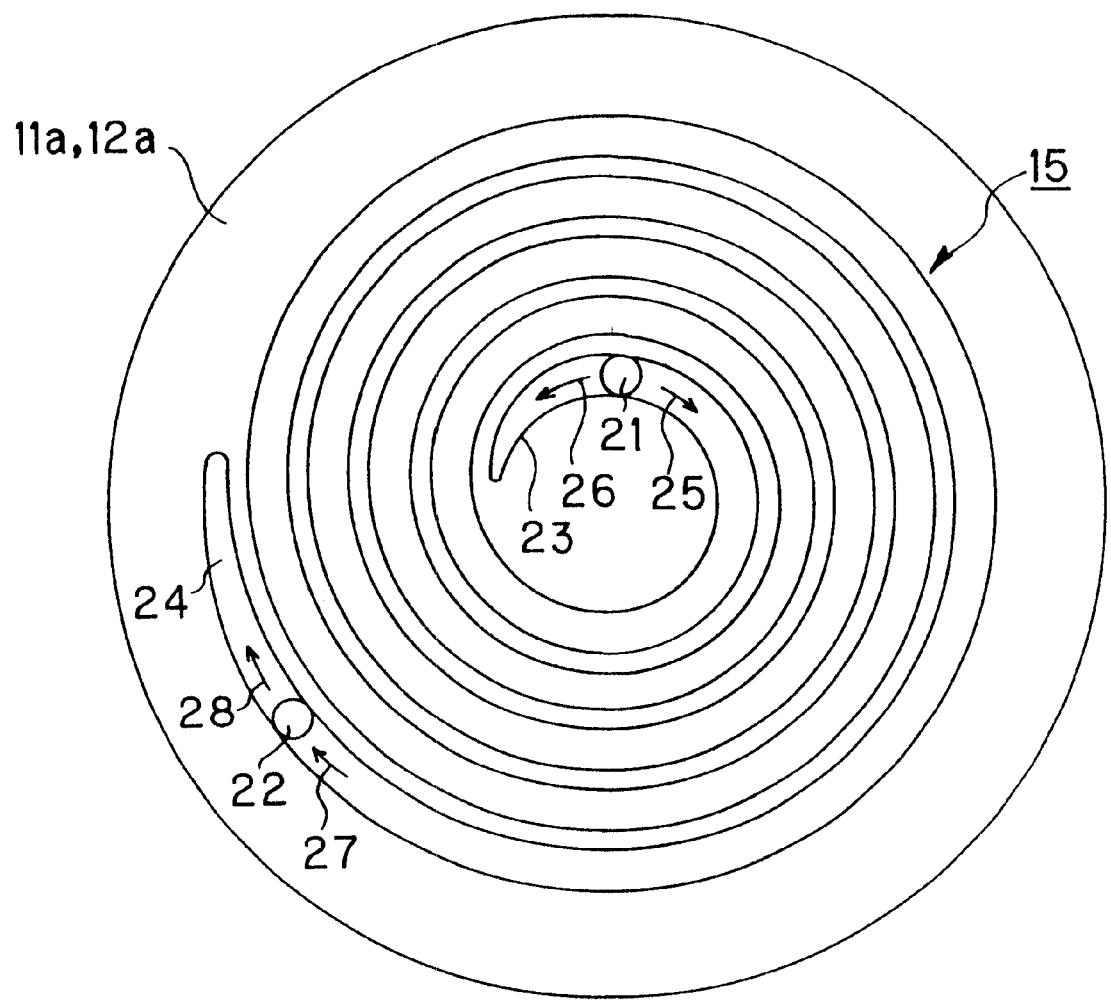
FIGS. 2A and 2B are plan views each showing the shape of a cooling water ditch formed for a mold of a disc manufacturing apparatus.

FIG. 2A shows a cooling water ditch formed on mirror plates 11a and 12a. The cooling water ditch 15 whose shape is shown in FIG. 2A is formed on both of the mirror plates 11a and 12a. Preferably, both mirror plates 11a and 12a are located in a manner that both ends of each ditch coincide in position so as to face to each other between the plates.

When making reference to FIG. 2A, the cooling water ditch 15 has an inlet 21 and an outlet 22 for cooling water. The cooling water enter the inlet by a not-shown mechanism so as to be guided along the path of the cooling water ditch 15, circulates along the circular paths, and is exhausted from the outlet 22. This enables both mirror plates 11a and 12a to be cooled, so that the resin present in the cavity 13 is cooled as well.

Figure 2B:
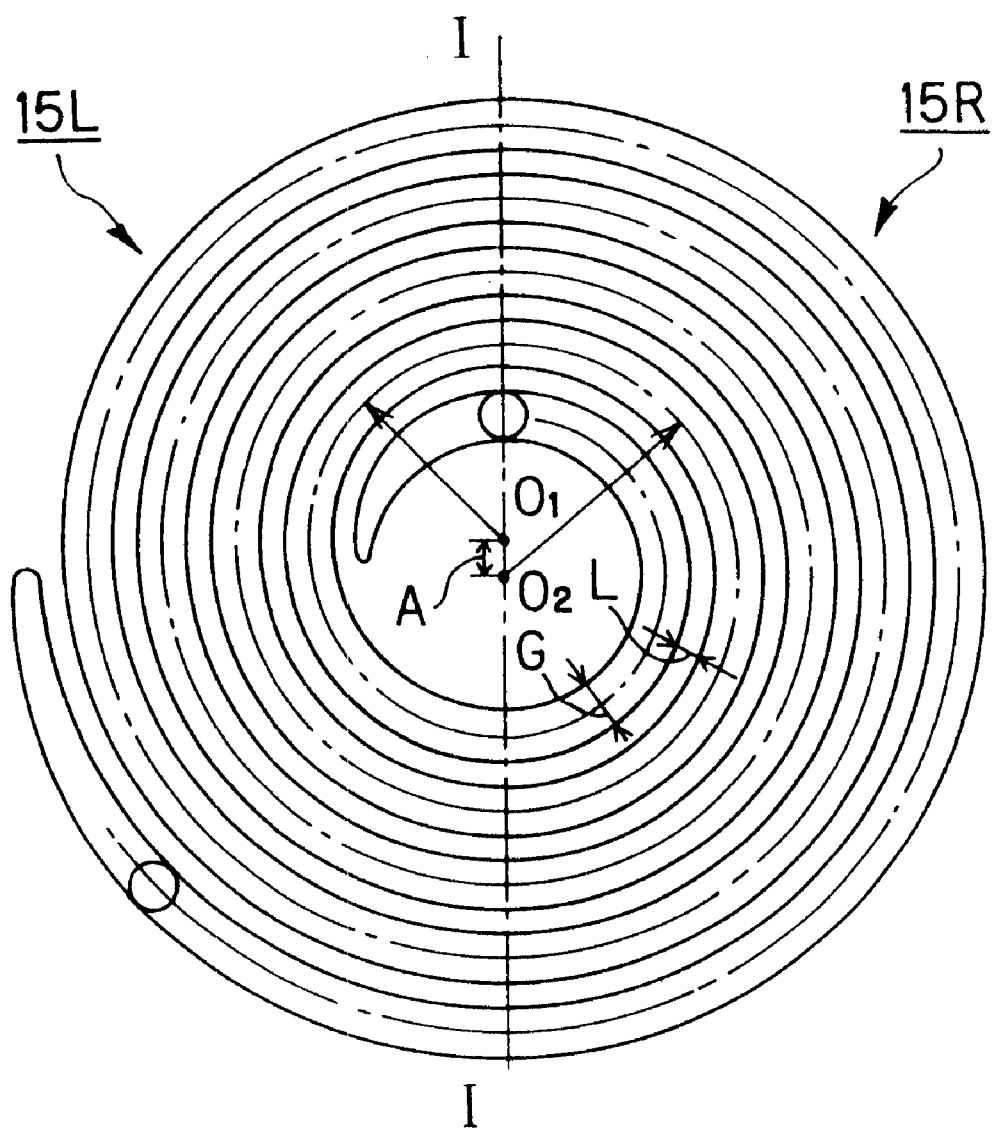

Referring to FIG. 2B, how to make the cooling water ditch 15 will now be described. The cooling water ditch 15 shown in FIG. 2A consists of two right- and left-side portions when viewing from a central line I—I in FIG. 2B. Namely, the left-side cooling water ditch 15L is a set of half-arcs centered at a circular center $O_1$ (arcs of which central angles are 180 degrees), while the right-side cooling water ditch 15R is a set of half-arcs centered at a circular center $O_2$. Accordingly, a plurality of half-arcs located on the left side of the center line I—I are composed of concentric half-arcs centered at the circular center $O_1$, whilst a plurality of half-arcs which located on the right side of the center lone I—I are composed of concentric half-arcs centered at the circular center $O_2$. Combining these plural half-arcs with each other with shifting those by a distance between the circular centers $O_1$ and $O_2$ forms the cooling water ditch 15.

Such a configuration can be realized by fulfilling a condition of:

$$A=(G+L)/2 \qquad \text{(formula 1)},$$

where A denotes a distance between the circular centers $O_1$ and $O_2$, G denotes a width of the cooling water ditch, and L denotes an interval between adjoining paths of the cooling water ditch. FIG. 5 shows examples of shapes of cooling water ditches that are formed so as to satisfy the formula 1 in cases where the number of turns of a cooling water ditch is changed in a range of 3 to 10 turns.

Figure 7:
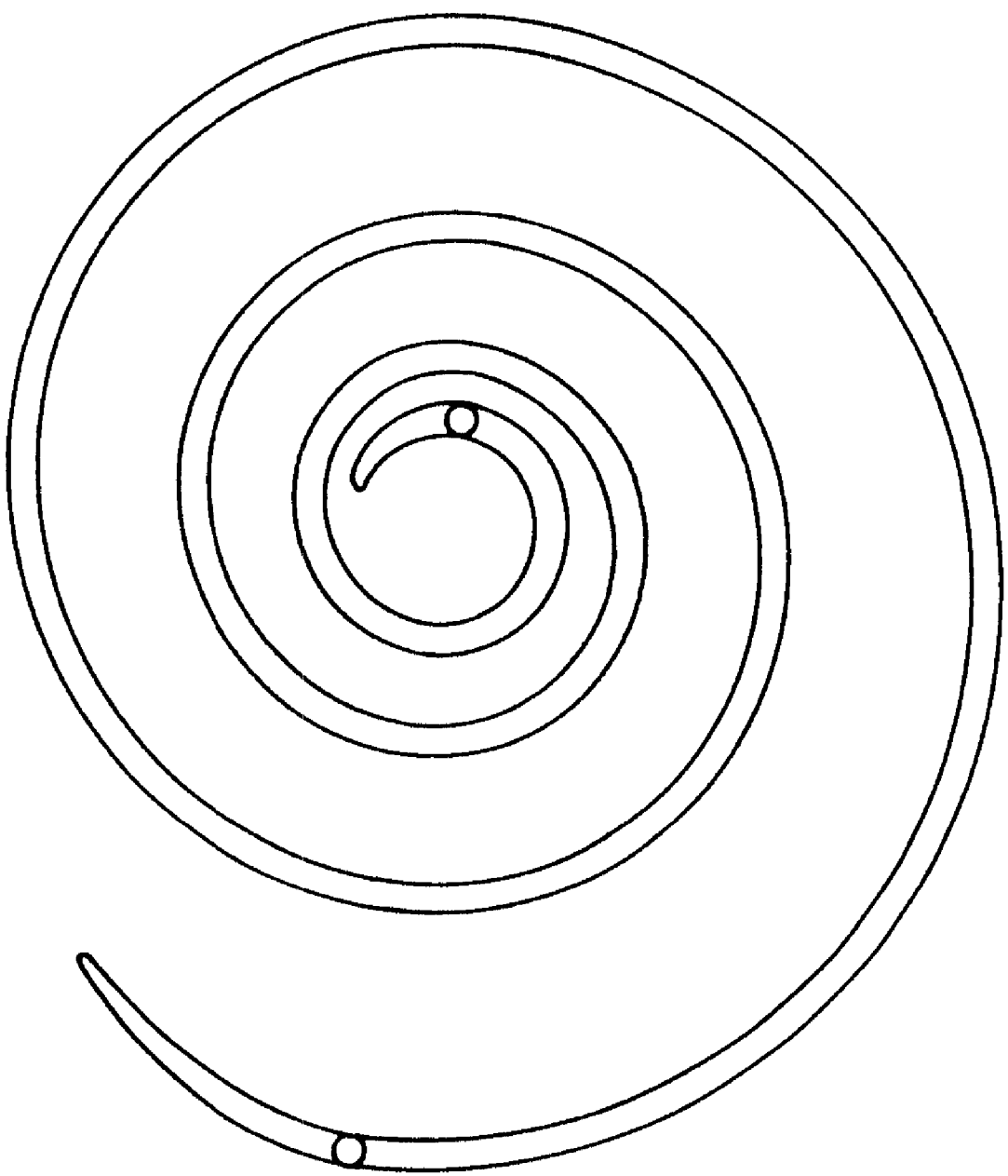
FIG. 7 is a plan view illustrating the shape of a modified cooling water ditch that can be manufactured for a mold of a disk manufacturing apparatus according to the present invention.

By the way, in the embodiment according to FIG. 2A, the cooling water ditch is formed by mutually combining the two sets of concentric half-arcs. Alternatively, it is possible to form a cooling water ditch by mutually combining three or more arcs. For instance, mutually combining three sets of arcs whose central angles are 120 degrees or mutually combining four sets of arcs whose central angles are 90 degrees leads to the formation of a cooling water ditch identical to the foregoing one. (In other words, the half-circles shown in FIG. 2A can be regarded as the arcs of which central angle is 180 degrees.) Still alternatively, as pictorially exemplified in FIG. 7, another cooling water ditch similar to a spiral shape can also be achieved by mutually connecting a plurality of half-arcs of which radiuses differ from each other, in turn, in the order of the sizes of the radiuses.

Forming a cooling water ditch using a plurality of sets of arcs, as described above, leads to an advantage that the mirror plates can be worked in a shorter time and in an easier way. Normally, as the mirror plates of a cooling water ditch are worked by cutting, it is considerably difficult to form a shape in which the radius changes continuously like a spiral, for example. By contrast with the above, working of plates into shapes of arcs each of which center and radius are fixed are rather easier. As a result, to form a cooling water ditch by mutually combining a plurality of arcs results in that an even cooling characteristic is materialized while securing the easiness of working.

Additionally, as shown I FIG. 2A, convergent or tapered ends 23 and 24 are formed at both edges of the ditch path beyond both of the inlet 21 and the outlet 22, respectively. Unless these convergent ends 23 and 24 are formed, the cooling water ditch 15 suddenly terminates at the inlet 21 and the outlet 22, respectively. In such as case, cooling effects in areas further extending beyond the inlet 21 and outlet 22 into the inner and outer circumferential sides decrease drastically and the strengths of those areas change drastically. This is undesirable for obtaining an even cooling characteristic distribution and an even strength distribution. In order to avoid such a drawback, the convergent ends 23 and 24 are formed to terminate the path of a cooling water ditch gradually in the width.

Owing to the fact that the convergent end 23 is present, cooling water that enters into the inlet 21 partly flows along the direction of an arrow 25, while part of the entered cooling water flows in the direction of an arrow 26 before flowing in reverse to the direction of the arrow 25. To prevent the cooling water from lingering in this convergent end 23, a guide mechanism can be placed so that the cooling water introduced through the inlet 21 is partly guided in the direction of the arrow 26, then flows backwards along the direction shown by the arrow 25. Another means for avoiding such lingering of the cooling water is giving changes to a width, a depth, and others of the ditch of the convergent end to produce a flow of the cooling water.

Similarly, the above guide mechanism or guide shape can be applied to the other convergent end 24, so that the cooling water which have been flowed along the direction of an arrow 27 is once partly guided into the convergent end 24 along an arrow 28, then flows backwards to return to the outlet 22 to be exhausted. This avoids the cooling water from lingering in the convergent end 24, thereby maintaining an excellent cooling effect.

The cooling water ditch exemplified in FIG. 2A is used for a mold preferable to a manufacturing apparatus for a compact disc (CD) or digital video disc (DVD) of which diameter is approximately 120 mm, in which the outermost circumference of the ditch is approximately 160 mm in diameter. In this way, it is preferred to use a mold that has a cooling water ditch of which outermost circumferential diameter lager than the diameter of a disc substrate to be manufactured. This usage guarantees that a disc is formed within the area where the cooling water ditch is formed, resulting in that a cooling characteristic distribution and a strength distribution in the area where a disc to be manufactured is formed are kept more evenly than being not so.

Figure 6:
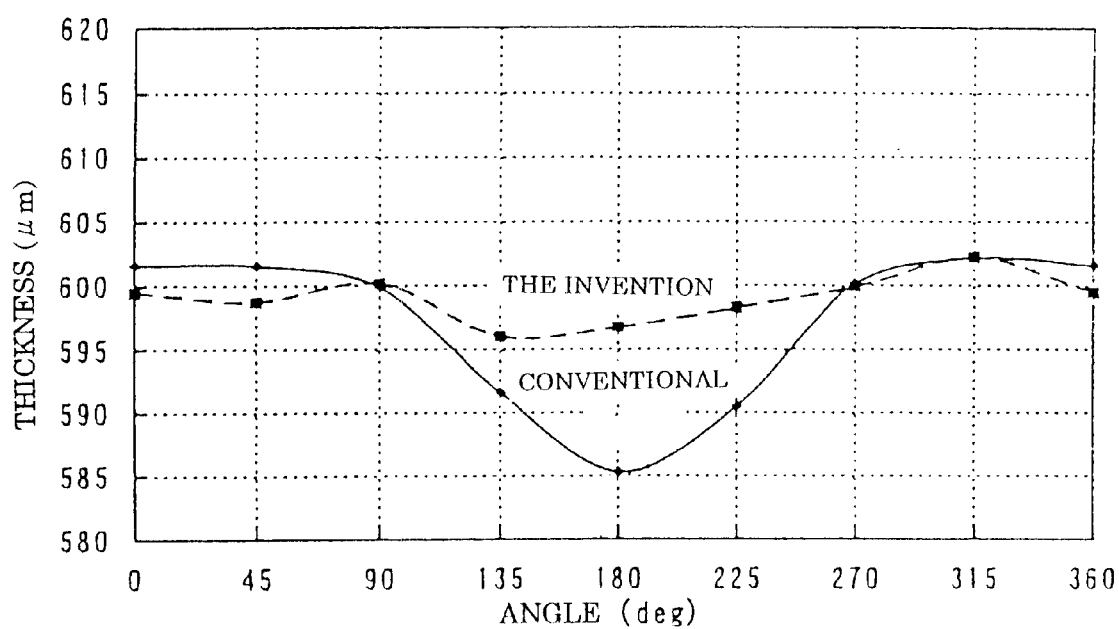
FIG. 6 shows graphs irregularities in thickness of disc substrates manufactured using both a mold according to the present invention and a conventional mold.

FIG. 6 shows the results of thickness distributions compared between a disc substrate manufactured using a mold having a conventionally shaped cooling water ditch and another disc substrate manufactured using a mold having a cooling water ditch shaped according to the present invention. The results shown in FIG. 6 are obtained from a mold of which shape is based on FIGS. 2A and 2B, in which the ditch width G=8 mm, ditch path interval L=4 mm, distance between circular centers A=6 mm, ditch's outermost circumferential diameter D=168 mm, and 5 turns.

As understood from FIG. 6, the disc substrate manufactured using the conventional mold shows a thinner region by an amount of approximately 10 microns than an average thickness of the entire substrate, in a direction along an angle of 180 degrees in which the flex section is present (refer to a solid line in FIG. 6). In contrast, the disc substrate manufactured using the mold according to the present invention is substantially even in thickness in its circumferential direction of the substrate (refer to a dotted line in FIG. 6). Thus, since the molds of the present invention provide the mirror plates that distort evenly in their circumferential directions against the injection pressure, a resultantly manufactured disc substrate has almost no thinner portion. Therefore, there can be provided a disc on which signal deterioration is smaller at any position when the disc is subject to signal reproduction.

As having been described, according to the present invention, provided is a mold for a disc substrate manufacturing apparatus, which distorts evenly in its circumferential direction. Manufacturing discs with the use of this mold is able to provide discs having almost no irregularities in thickness in their circumferential directions, particularly, having no thinner sections.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No.11-247680 filed on Sep. 1, 1999 including the specification, claims, drawings and summary is incorporated herein by reference in its entirety.

What is claimed is:

1. A disc-producing mold for forming a disc substrate having a circumferential direction by injection molding, comprising a cooling water ditch which is formed by a plurality of arcs of which radiuses are different from each other and connected to each other along the arc, wherein the cooling water ditch has a constant width portion having an approximately constant width and connecting a cooling water inlet and a cooling water outlet of the ditch, a first tapered part connected to the inlet and located on an opposite side of the inlet with respect to the constant width part, and a second tapered part connected to the outlet and located on an opposite side of the outlet with respect to the constant width part, said first tapered part gradually converging along a substantial portion of a length thereof and said second tapered part gradually converging along a substantial portion of a length thereof.

2. A disc-producing mold for forming a disc substrate having a circumferential direction by injection molding, comprising a cooling water ditch which is formed by a plurality of arcs of which radiuses are different from each other and connected to each other along the arc, wherein the cooling water ditch is shaped into a configuration where half-arcs having mutually different two centers are alternately connected to each other, in which a distance A between the two centers is expressed by A=(G+L)/2, where G denotes a width of the cooling water ditch and L denotes an interval between adjoining ditch paths of the cooling water ditch.

3. A disc producing apparatus comprising the mold according to claim 1.

4. A disc-producing mold for forming a disc substrate having a circumferential direction by injection molding, comprising a cooling water ditch which revolves a plurality of turns with continuous crooks in the circumferential direction, wherein the cooling water ditch is formed by a plurality of arcs of which radiuses are different from each other and connected to each other along the arcs, wherein the cooling water ditch has a constant width portion having an approximately constant width and connecting a cooling water inlet and a cooling water outlet of the ditch, a first tapered part connected to the inlet and located on an opposite side of the inlet with respect to the constant width part, and a second tapered part connected to the outlet and located on an opposite side of the outlet with respect to the constant width part, said first tapered part gradually converging along a substantial portion of a length thereof and said second tapered part gradually converging along a substantial portion of a length thereof.

5. A disc-producing mold for forming a disc substrate having a circumferential direction by injection molding, comprising a cooling water ditch which revolves a plurality of turns with continuous crooks in the circumferential direction, wherein the cooling water ditch is shaped into a configuration where half-arcs having mutually different two centers are alternately connected to each other, in which a distance A between the two centers is expressed by A=(G+L)/2, where G denotes a width of the cooling water ditch and L denotes an interval between adjoining ditch paths of the cooling water ditch.

6. The disc producing apparatus comprising the mold according to claim 4.

7. The disc producing apparatus comprising the mold according to claim 2.

8. The disc producing apparatus comprising the mold according to claim 5.

* * * * *